May 17, 1927.

W. WEBBER

KNOTTER CAM OILER FOR HARVESTERS

Filed Jan. 12, 1925

1,629,190

Inventor.
William Webber,
By H. P. Daniels
Atty.

Patented May 17, 1927.

1,629,190

UNITED STATES PATENT OFFICE.

WILLIAM WEBBER, OF LA GRANGE, ILLINOIS, ASSIGNOR TO INTERNATIONAL HARVESTER COMPANY, A CORPORATION OF NEW JERSEY.

KNOTTER CAM OILER FOR HARVESTERS.

Application filed January 12, 1925. Serial No. 1,811.

This invention relates to an oiler or lubricating device for the cam wheel and associated driven members in the knotting mechanisms used for binding sheaves of grain in grain harvesters and the like.

In the operation of grain binders in the field, and similar machines employing knotter mechanisms, considerable difficulty has been experienced due to the faulty operation of such knotting mechanisms, because of the difficulty in supplying during the operation of the mechanism a lubricant to the gear faces on the cam wheel and the associated pinions for driving the knotter hook and cord holder.

It is, therefore, an object of this invention to provide a simple and efficient means for supplying the mutilated gear faces on the cam wheel of the conventional knotter mechanism and the pinions driven thereby with a lubricant during the operation thereof.

It is a further object of this invention to provide a device of the character described which may be easily attached and used with existing knotter mechanisms now in the field without great expense and trouble.

Further objects of this invention will appear as this disclosure progresses.

These objects are accomplished by this invention in the provision of a bracket or holder integrally or otherwise formed on the frame of the knotter in such a position that an oil soaked pad carried by the holder will be wiped or engaged by the gear faces on the cam wheel as the wheel rotates and take lubricant therefrom for lubricating itself and the associated pinions driven thereby for imparting rotation to the cord holder and knotter hook.

In the accompanying sheet of drawings wherein like characters of reference denote like parts throughout the several views,—

Figure 1:
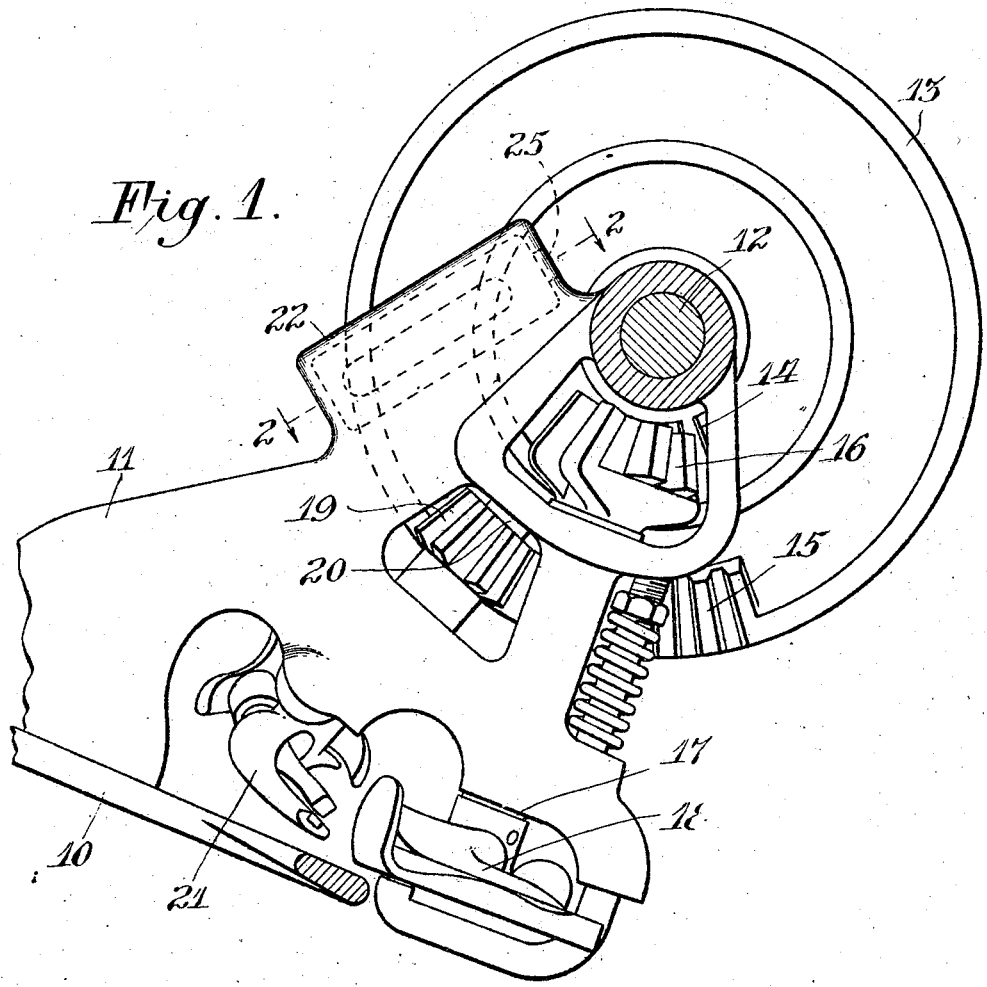
Fig. 1 is an end view of the knotter shaft mounting and the associated mechanism for tying and twisting the twine around a sheaf of grain to be bound.

In the drawings is illustrated the preferred embodiment of the present invention shown in association with a conventional knotting mechanism employed in grain binding machines, and comprises the usual breast-plate 10 to which is securely fastened in any suitable manner the knotter frame 11 in which is journaled the knotter shaft 12. The shaft 12 has fixed thereto in the usual way a cam wheel 13 provided with the mutilated gear face 14 and the mutilated gear face 15, the former adapted to impart rotation to a pinion 16 for intermittently rotating the shaft 17, which carries the conventional cord holder 18, while the gear face 15 intermittently imparts rotation to the pinion 19 for rotating the shaft 20 which carries with it the usual knotter hook 21.

Figure 2:
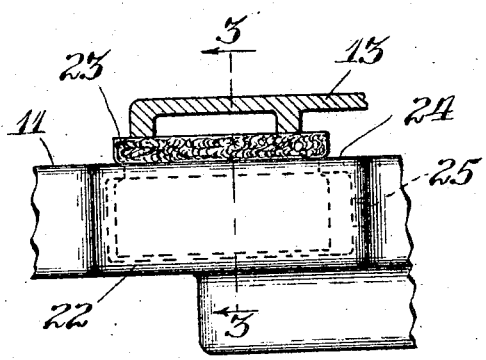
Fig. 2 is a detail view, partly in section, showing the improved oiler attachment taken along the line 2—2 of Fig. 1 and looking in the direction of the arrows.
Figure 3:
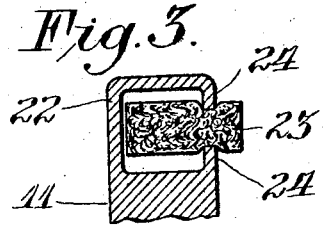
Fig. 3 is a further detail of the oiler attachment taken in section along the line 3—3 of Fig. 2.

The purpose of this invention, as stated, is to provide a simple and efficient means for supplying lubricant to the mutilated gear faces on the cam wheel and the pinions driven thereby. This problem is solved effectively by providing integrally, or in some other suitable fashion, a hollow bracket or holder 22 on the knotter frame adjacent the cam wheel. This bracket or holder is closed on all sides except its front side where it is longitudinally slotted for the insertion of a wick or pad 23, the wick extending into the bracket, as shown in Figs. 2 and 3, and projecting through the aperture a slight distance. The wick is of such a size that it must be crowded into the aperture so that the front walls 24 of the bracket dig into it for the purpose of retaining it securely in position. An aperture 25 at one end of the hollow bracket is provided so that the lubricant supply may be replenished by means of an oil can or the like. It will be observed that the holder and wick are in such a position on the frame that as the cam wheel rotates intermittently the gear faces thereof engage or wipe over the projecting end of the pad and take lubricant therefrom and supply it to the pinions 16 and 19 driven thereby.

As the wick or pad wears, of course, from the constant wiping action of the gear faces, it may be pulled out very easily by pliers so that an efficient contact may always be maintained. If the pad has become completely worn out, a new one may obviously be easily substituted.

It will thus be appreciated from the above disclosure that the device of the present invention efficiently and successfully solves the problem of supplying lubricant in a mechanism of the type described and that as a result the tendency for wear on these parts is considerably lessened and the ease of operation thereof considerably enhanced.

The preferred form of the invention, of course, has been shown, and it is to be understood that various changes in the form, construction, and arrangement of parts may be made by those skilled in the art without departing from the spirit of the invention as hereinafter claimed.

What is claimed as new is:

1. In a knotter mechanism for binding mechanisms having a frame, a knotter shaft carried in the frame, a cam wheel having gear faces fixed to said shaft, a knotter hook pinion and a cord holder pinion carried on shafts journaled in the frame and engageable with the gear faces on the cam wheel, and means on the frame for automatically lubricating the gear faces on the cam as the same turns.

2. In a knotter mechanism for binding mechanisms having a frame, a knotter shaft carried in the frame, a cam wheel having gear faces fixed to said shaft, a knotter hook pinion and a cord holder pinion carried on shafts journaled in the frame and engageable with the gear faces on the cam wheel, and means on the frame engageable by the gear faces on the cam wheel for automatically lubricating said gear faces and pinions as the same operate.

3. In a knotter mechanism for binding mechanisms having a frame, a knotter shaft carried in the frame, a cam wheel having gear faces fixed to said shaft, a knotter hook pinion and a cord holder pinion carried on shafts journaled in the frame and engageable with the gear faces on the cam wheel, and a bracket provided with an oil soaked pad carried on the frame, said pad engageable by the gear faces on the cam wheel for lubricating said gear faces and pinions.

4. In a knotter mechanism for binding mechanisms having a frame, a knotter shaft carried in the frame, a cam wheel having gear faces fixed to said shaft, a knotter hook pinion and a cord holder pinion carried on shafts journaled in the frame and engageable with the gear faces on the cam wheel, and a bracket integrally formed on the frame and provided with an oiled pad, the bracket being carried on the frame in a position permitting the gear faces on the cam wheel to engage the oiled pad for lubricating said gear faces and pinions.

5. In a knotter mechanism for binding mechanisms having a frame, a knotter shaft carried in the frame, a cam wheel having gear faces fixed to said shaft, a knotter hook pinion and a cord holder pinion carried on shafts journaled in the frame and engageable with the gear faces on the cam wheel, a hollow bracket provided with a projecting oiled pad carried on the frame, said pad engageable by the gear faces on the cam wheel for lubricating the gear faces and pinions, and means formed on the bracket for retaining the oiled pad in projecting position.

6. In a knotter mechanism for binding mechanisms having a frame, a knotter shaft journaled in the frame, a gear wheel on said shaft, means operable by said wheel for operating a knot tying means, and means on the frame engageable by the gear wheel for lubricating the gear wheel and the knot tying operating means.

7. In a knotter mechanism for binding mechanisms having a frame, a knotter shaft journaled in the frame, a gear wheel on said shaft, means operable by said wheel for operating a knot tying means, and a bracket provided with an oil soaked pad carried on the frame and engageable by the gear wheel for lubricating the gear wheel and the knot tying operating means.

In testimony whereof I affix my signature.

WILLIAM WEBBER.